US012694782B1

(12) United States Patent
Bradley

(10) Patent No.: US 12,694,782 B1
(45) Date of Patent: Jul. 28, 2026

(54) DRONE CROSSING ARM FOR STOPPING WRONG-WAY VEHICLES

(71) Applicant: James P. Bradley, Dallas, TX (US)

(72) Inventor: James P. Bradley, Dallas, TX (US)

( * ) Notice: Subject to any disclaimer, the term of this patent is extended or adjusted under 35 U.S.C. 154(b) by 0 days.

(21) Appl. No.: 19/379,967

(22) Filed: Nov. 5, 2025

(51) Int. Cl.
| | |
|---|---|
| G08G 1/056 | (2006.01) |
| B64U 10/14 | (2023.01) |
| B64U 20/80 | (2023.01) |
| B64U 80/30 | (2023.01) |
| B64U 80/40 | (2023.01) |
| F21S 43/13 | (2018.01) |
| F21W 103/60 | (2018.01) |
| G08G 1/09 | (2006.01) |
| G08G 1/16 | (2006.01) |
| B64U 101/24 | (2023.01) |

(52) U.S. Cl.
CPC ............. G08G 1/056 (2013.01); B64U 10/14 (2023.01); B64U 20/80 (2023.01); B64U 80/30 (2023.01); B64U 80/40 (2023.01); F21S 43/13 (2018.01); G08G 1/09 (2013.01); G08G 1/164 (2013.01); B64U 2101/24 (2023.01); B64U 2201/102 (2023.01); F21W 2103/60 (2018.01)

(58) Field of Classification Search
CPC ......... G08G 1/056; G08G 1/09; G08G 1/164; F21S 43/13; B64U 80/40; B64U 80/30; B64U 20/80; B64U 10/14; B64U 2201/102; B64U 2101/24; F21W 2103/60
USPC .......................................................... 701/2
See application file for complete search history.

(56) References Cited

U.S. PATENT DOCUMENTS

| | | | | |
|---|---|---|---|---|
| 12,062,281 | B1 * | 8/2024 | Baker ..................... | G08G 1/091 |
| 12,153,451 | B1 * | 11/2024 | Perritt, Jr. ............. | G05D 1/695 |
| 2015/0142211 | A1 * | 5/2015 | Shehata ................... | G08G 5/57 |
| | | | | 701/2 |
| 2018/0075759 | A1 * | 3/2018 | Kim .......................... | G08G 5/55 |
| 2020/0130827 | A1 * | 4/2020 | Kozak ..................... | E01F 9/576 |

(Continued)

OTHER PUBLICATIONS

Isop, W.A., Pestana, Ermacora, Fraundorfer and Schmalstieg, "Micro Aerial Projector—stabilizing projected images of an airborne robotics projection platform," Oct. 2016 IEEE IROS, p. 5618-5625. https://ieeexplore.ieee.org/stamp/stamp.jsp?tp=&arnumber=7759826 &tag=1 (Year: 2016).*

(Continued)

*Primary Examiner* — Matthias S Weisfeld
*Assistant Examiner* — Hyang Ahn
(74) *Attorney, Agent, or Firm* — Terrile, Cannatti & Chambers, LLP; Michael Rocco Cannatti

(57) ABSTRACT

A computerized roadway safety system, method, and apparatus are provided for preventing wrong-way collisions on roadways and exit ramps of roadways by maintaining robotic drones at a drone docking station; monitoring the exit ramp with sensors to detect a wrong-way vehicle that enters the exit ramp in a wrong direction; transmitting a wrong-way vehicle detection signal from the sensors upon detecting the wrong-way vehicle; and launching a plurality of robotic drones in response to the wrong-way vehicle detection signal to fly to a position over the exit ramp in front of the wrong-way vehicle, where the plurality of robotic drones automatically hover in a linear formation and at a predetermined distance above the exit ramp to form a crossing arm barrier in front of the wrong-way vehicle to block forward movement of the wrong-way vehicle.

16 Claims, 7 Drawing Sheets

(56) References Cited

U.S. PATENT DOCUMENTS

| | | | |
|---|---|---|---|
| 2023/0002082 A1* | 1/2023 | Shuff | B64U 80/70 |
| 2024/0257643 A1* | 8/2024 | Bradley | B64U 10/20 |

OTHER PUBLICATIONS

Iskandarani, M., S. N. Givigi, G. Fusina, and A. Beaulieu. "Unmanned Aerial Vehicle formation flying using Linear Model Predictive Control." May 22, 2014. p. 1-6. https://ieeexplore.ieee.org/document/6819230 (Year: 2014).*

* cited by examiner

1
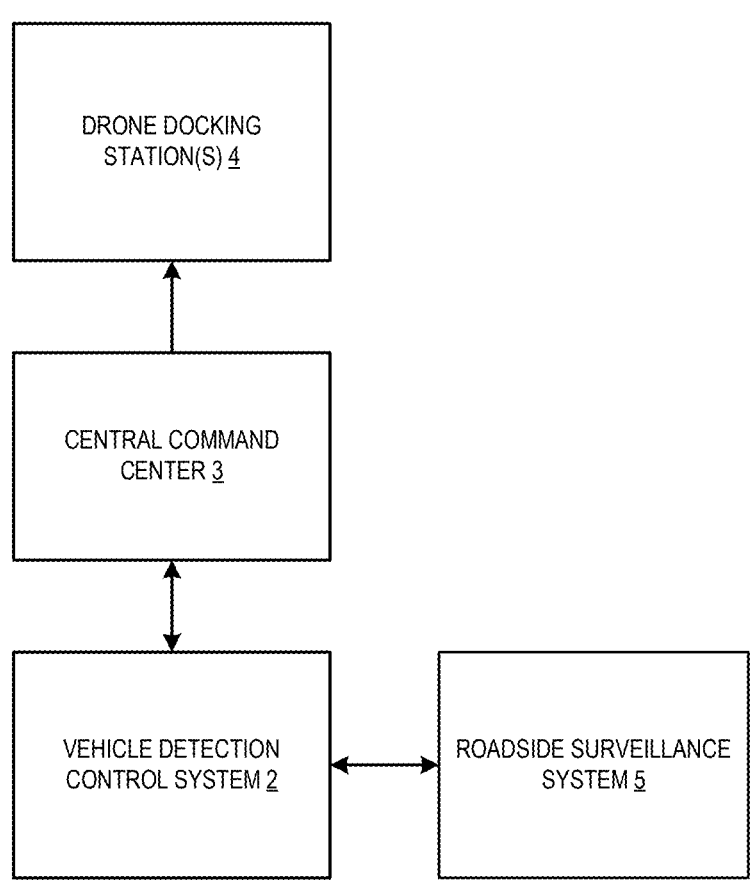
*Figure 1*

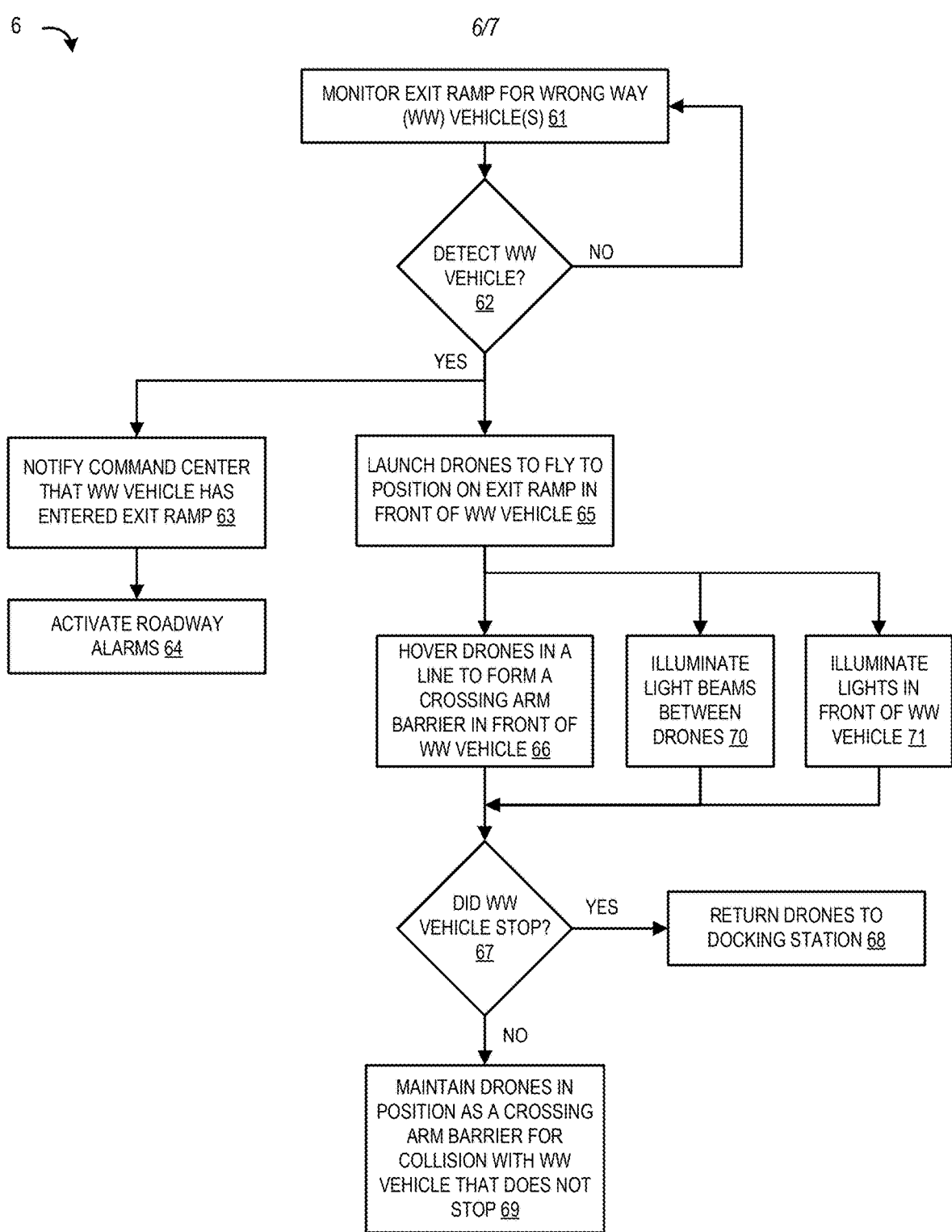

6

6/7

MONITOR EXIT RAMP FOR WRONG WAY (WW) VEHICLE(S) 61

DETECT WW VEHICLE? 62

NO

YES

NOTIFY COMMAND CENTER THAT WW VEHICLE HAS ENTERED EXIT RAMP 63

ACTIVATE ROADWAY ALARMS 64

LAUNCH DRONES TO FLY TO POSITION ON EXIT RAMP IN FRONT OF WW VEHICLE 65

HOVER DRONES IN A LINE TO FORM A CROSSING ARM BARRIER IN FRONT OF WW VEHICLE 66

ILLUMINATE LIGHT BEAMS BETWEEN DRONES 70

ILLUMINATE LIGHTS IN FRONT OF WW VEHICLE 71

DID WW VEHICLE STOP? 67

YES

RETURN DRONES TO DOCKING STATION 68

NO

MAINTAIN DRONES IN POSITION AS A CROSSING ARM BARRIER FOR COLLISION WITH WW VEHICLE THAT DOES NOT STOP 69

Figure 6

DRONE CROSSING ARM FOR STOPPING WRONG-WAY VEHICLES

BACKGROUND OF THE INVENTION

Field of the Invention

The present disclosure generally relates to the field of vehicle traffic monitoring and safety systems. In one aspect, the present invention relates to a roadway safety system to reduce or prevent wrong-way collisions on a roadway, such as a tollway, freeway or highway.

Description of the Related Art

Wrong way drivers present a danger to the public safety and traveling on roadways. Wrong way collisions frequently result in fatalities and serious injuries. Wrong-way drivers cause collisions, often times head-on collisions, that result in serious injuries or death. Studies have shown that wrong-way drivers are frequently impaired or under the influence of alcohol or drugs. These studies have also shown that elderly drivers may become confused and drive the wrong-way onto an exit ramp which allows them to enter the roadway in the wrong direction. Current wrong way detection systems and wrong way signage have been used for years to try to alert drivers that they are traveling in the wrong direction on a roadway, but have proven ineffective in preventing wrong-way collisions. For example, various static or fixed warning systems have been deployed to activate visual or audio alarms upon detecting the presence of a wrong-way vehicle traveling the wrong direction on a roadway or the exit ramp. Unfortunately, impaired wrong-way drivers are incapable of recognizing wrong way signs and responding to them by changing their direction of travel.

As seen from the foregoing, the existing vehicle traffic monitoring and roadway safety systems are ineffective due in large part to the challenges of using fixed visual or audible warnings that require the driver to find and recognize them from a distance while the vehicle is moving in order to prevent the driver from entering the roadway in the wrong direction.

BRIEF SUMMARY

A roadway safety system, method, and apparatus are provided to promptly detect when a wrong way vehicle enters an exit ramp in the wrong direction and then launch one or more drones which fly to a position and hover in formation in front of the wrong-way vehicle at a pre-determined distance above the road surface of the exit ramp to act as a crossing arm to the approaching wrong-way vehicle. Each drone may be stored, charged, and maintained in one or more drone docking stations at the exit ramp or in remote locations along the roadway. A computerized roadway safety system command center continuously monitors the exit ramp and/or the roadway to determine when a vehicle enters in the wrong direction. Upon receiving a signal upon detecting a wrong-way vehicle has entered the exit ramp, the computerized roadway safety system command center immediately sends an activation signal to launch one or more drones, such as quadcopters, from the drone docking station(s) to fly and position themselves across the exit ramp ahead of the wrong-way vehicle, preferably near the entrance of the exit ramp from the roadway. Flying to a designated location on the exit ramp/roadway in front of the wrong-way vehicle, the drones hover in formation at a pre-determined distance above the exit ramp to act as a crossing arm to the approaching wrong-way vehicle. The drones may be equipped with lights, signs and/or speakers to communicate to the driver of the wrong way vehicle that they need to stop and reverse their direction of travel. In addition or in the alternative, the drones may be equipped with laser light sources that project laser light beams between hovering drones to enhance the visual appearance of the drone(s) forming a "crossing arm." If the drones or sensors on the exit ramp detect that the wrong-way vehicle stops and changes its direction of travel (e.g., self-corrects), then the drones return to the docking station (s), either automatically or in response to signals from the computerized roadway safety system command center. However, if the wrong-way vehicle does not self-correct, the drones maintain their position as a crossing arm barrier, resulting in the wrong way driver colliding with the drones as a way to prevent it from entering the roadway ahead. As seen from the foregoing, the disclosed roadway safety system, method, and apparatus provide an improvement over existing passive detection systems by sending multiple drones to fly to the wrong-way vehicle, thereby actively intervening to warn or stop the wrong way driver.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 1 shows a simplified block diagram of a computerized roadway safety system for detecting wrong-way vehicles and deploying a drone crossing arm for stopping wrong-way vehicles in accordance with selected embodiments of the present disclosure.

FIG. 6 illustrates a simplified flow chart showing the logic for operating a roadway safety system in accordance with selected embodiments of the present disclosure.

3

Figure 7:
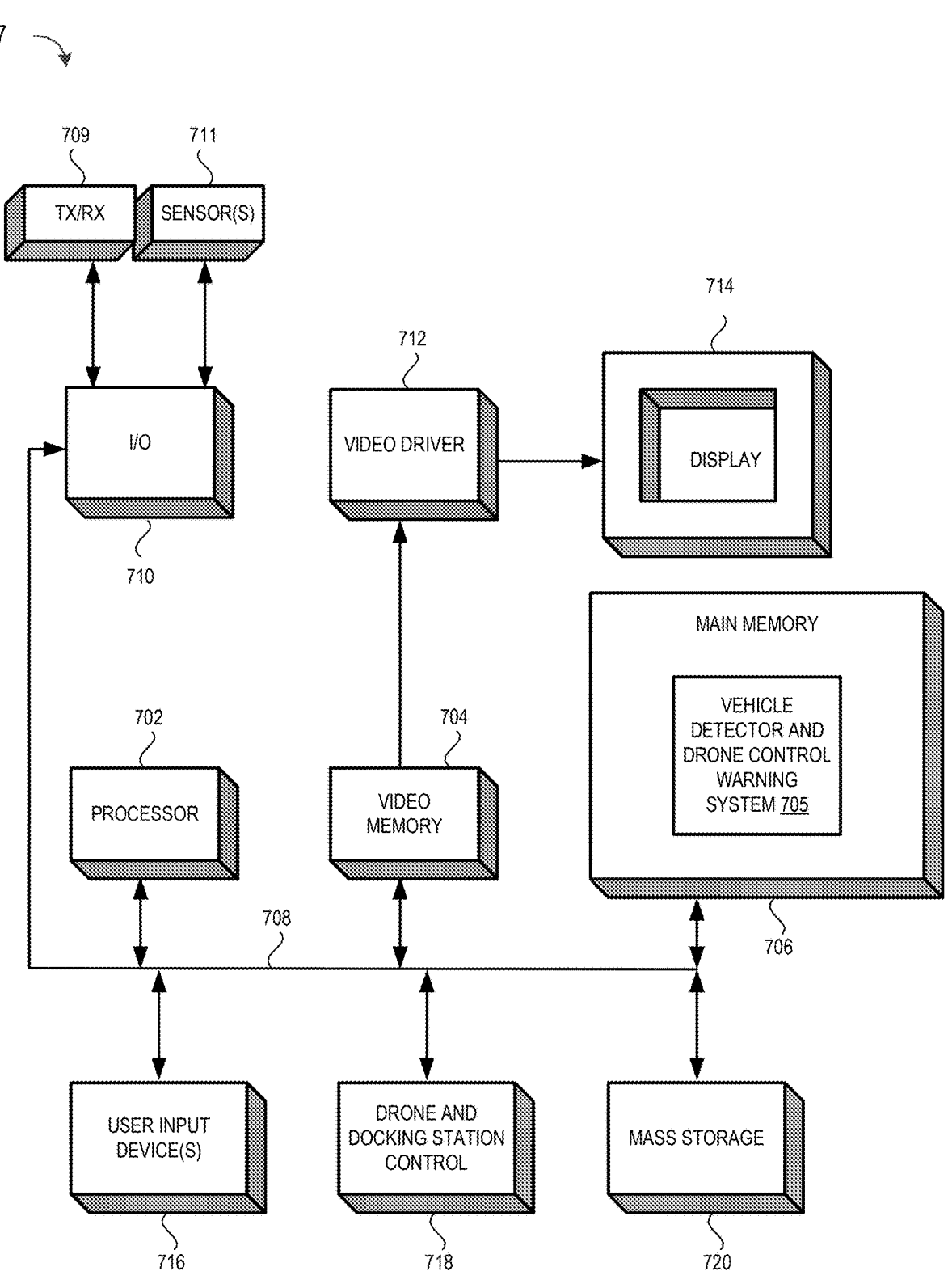

FIG. 7 is a simplified block diagram of a computer-based implementation of a vehicle detection and drone deployment system in accordance with selected embodiments of the present disclosure.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding.

DETAILED DESCRIPTION

A computer-controlled roadway safety system, method, and device to reduce or eliminate collisions caused by wrong-way drivers on a roadway is disclosed with reference to a computerized command center which is connected to one or more sensors for monitoring and promptly detecting a vehicle that enters a roadway in the wrong direction from a street. The sensor(s) for detecting wrong-way vehicles may include magnetic sensors, active remote sensors, electronic sensors, photoelectric sensors, cameras and/or physical sensors that are positioned or located in, nearby above or over the roadway. The physical sensors could operate by detecting the order in which mechanical petals or bars are depressed by a vehicle's tires passing over them. The detection of the direction of the vehicle traveling on the roadway may also be accomplished by two sensors in, or over the roadway that detect the direction of the travel from the order in which the sensors are activated, such as breaking the beams of light of a pair of electronic eyes. The detection of the direction of the vehicle traveling on the roadway may also be accomplished by active remote sensors, such as radar sensors, ultra-wide band sensors, lidar sensors, etc., which detect the direction of the wrong-way vehicle on the roadway. Once a wrong-way vehicle is detected, the computerized command center automatically deploys a plurality pre-programmed autonomous drones from one or more drone docking stations, where the drones can be charged or otherwise powered to enable the electric motors of these drones to propel the drones for controlled flight. Upon deployment, the pre-programmed autonomous drones are programmed to fly to a designated location on the roadway in front of the wrong-way vehicle where the drones hover in formation at a pre-determined height above the exit ramp to act as a "crossing arm" barrier to the approaching wrong-way vehicle. The pre-programmed autonomous drones may be equipped with lights, cameras, signs and/or speakers to communicate to the driver of the wrong way vehicle that they need to stop and reverse their direction of travel. In addition, each pre-programmed autonomous drone may include laser light sources which generate an array of laser light beams between adjacent drones to form light patterns of parallel or crossing light beams to create an image of a crossing arm barrier that will be seen by the driver of the approaching wrong-way vehicle. If the pre-programmed autonomous drones detect that the driver of the wrong-way vehicle stops the vehicle, turns around, or leaves the roadway, then the pre-programmed autonomous drones are programmed to return to the docking station(s). However, if the pre-programmed autonomous drones detect that the driver of the wrong-way vehicle continues to travel in the wrong direction, the pre-programmed autonomous drones are programmed to continue hovering at a predetermined height above the roadway and in front of the wrong-way vehicle to block further travel of the wrong-way vehicle. In this way, the pre-programmed autonomous drones forming the crossing arm of the computer-controlled roadway safety system would be sacrificed and hit by the wrong-way vehicle if it does not stop.

Various illustrative embodiments of the present invention will now be described in detail with reference to the accompanying figures which illustrate different views of a drone crossing arm system wherein a plurality of drones are programmed to fly in a line and hover in front of a wrong-way vehicle to prevent collisions caused by the wrong-way vehicle. While various details are set forth in the following description, it will be appreciated that the present invention may be practiced without the specific details, and that numerus implementation-specific decisions may be made to the invention described herein to achieve the device designer's specific goals, such a compliance with mechanical, electrical and/or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified plan and perspective views of a road safety system without including every device feature or geometry in order to avoid limiting or obscuring the present invention. Such descriptions and representations are used by those skilled in the art to describe and convey the substance of their work to others skilled in the art.

To provide additional details for an improved understanding of selected embodiments of the present disclosure, reference is now made to FIG. 1 which depicts a simplified block diagram of a computerized roadway safety system 1 for detecting wrong-way vehicles and deploying a drone crossing arm for stopping wrong-way vehicles driving on a roadway. As depicted, the computerized roadway safety system 1 operates under control of a central command center 3 which is communicatively coupled to one or more drone docking stations 4 that are located near an exit ramp or roadway. For example, the central command center 3 may be connected and configured to send an activation signal to launch one or more drones that are housed or maintained at the drone docking station(s) 4. The drones stored in the docking station 4 could be eVTOL drones with electric motors, but could also be less expensive eVTOL quadcopters. In addition, the central command center 3 is communicatively coupled to a vehicle detection control system 2 which continuously monitors the roadway(s) or exit ramp(s) to promptly detect any wrong-way vehicle(s) which are driving in the wrong direction. To this end, the vehicle detection control system 2 is communicatively coupled to a surveillance system 5 which may be implemented with one or more sensor(s) for detecting wrong-way vehicles, including but not limited to magnetic sensors, active remote sensors, electronic sensors, photoelectric sensors, cameras and/or physical sensors that are positioned or located in, nearby above or over the roadway. In addition, the surveillance system 5 which may be implemented with one or more sensors (e.g., cameras and/or RFID readers) located in such a position to take a picture or image of the wrong-way vehicle, as well as detecting and reading vehicle identification such as may be found on a toll tag or other RFID technology devices on the vehicle. The camera(s) in the surveillance system 5 could also capture a picture of the front and/or rear license plate of the wrong-way vehicle. The information could also include the vehicle registration sticker on the front windshield of the wrong-way vehicle. In addition, the surveillance system 5 could also collect information from a tollway identification tag, whether the roadway to be protected is a tollway or a highway. The information captured by the surveillance system 5, including any visual or digital data from an RFID device, would be transmitted from the vehicle detector control system 2 to a central command center 3.

Figure 2:
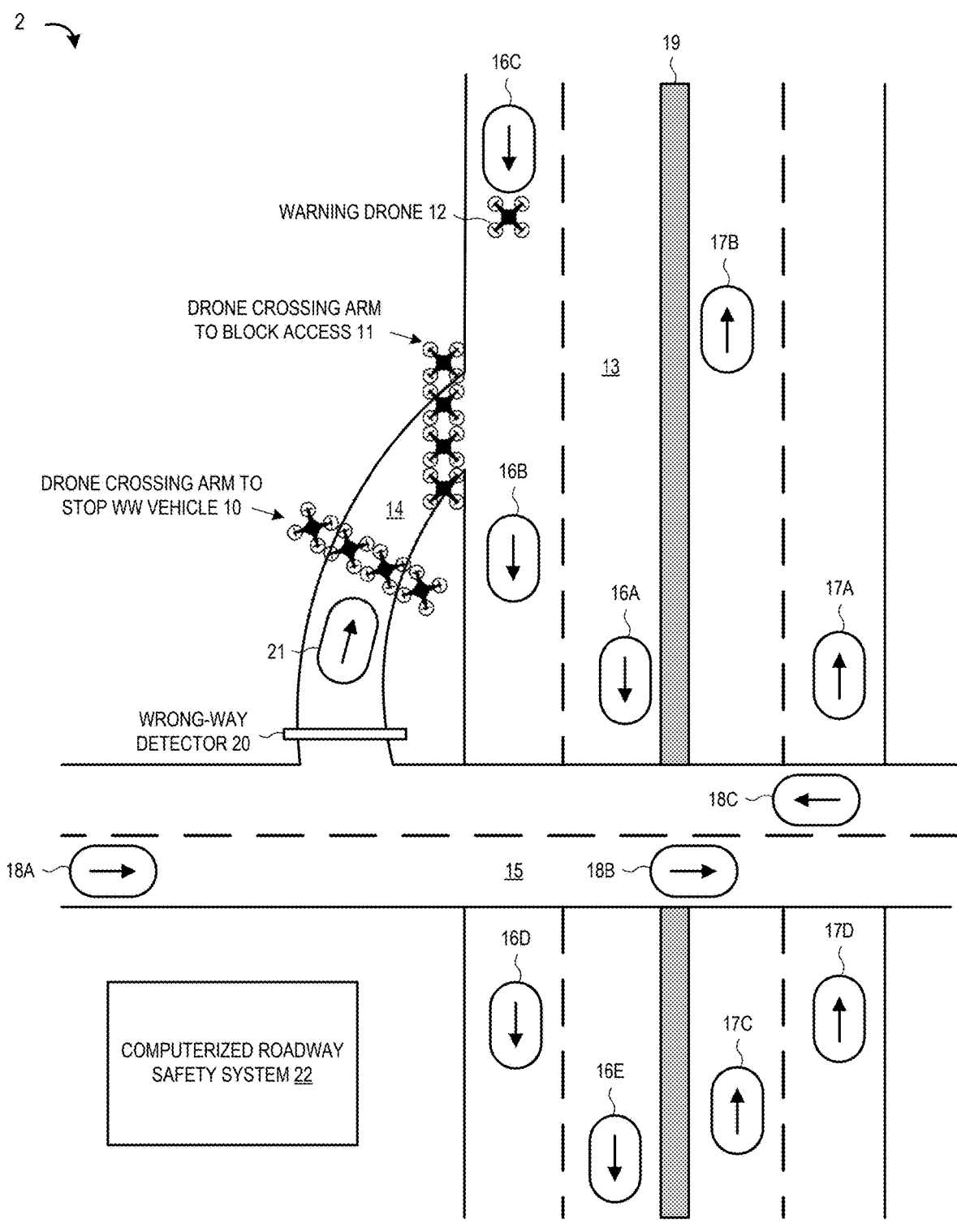
FIG. 2 shows schematic view of a junction of two roadways connected by an exit ramp wherein one or more drone crossing arms may be deployed to stop a wrong-way vehicle on the exit ramp in accordance with selected embodiments of the present disclosure.

To provide additional details for an improved understanding of selected embodiments of the present disclosure, reference is now made to FIG. 2 which depicts a schematic view 2 of a junction of two roadways 13, 15 connected by an exit ramp 14 wherein one or more drone crossing arms 10, 11 may be deployed under control of the computerized roadway safety system 22 to stop a wrong-way vehicle 21 on the exit ramp 14. As depicted, the vehicles 16A-E are traveling in the correct direction on one side of a divided roadway 13, and vehicles 17A-D are shown traveling in the correct direction on the other side of a median 19 of the roadway 13. In addition, an exit ramp 14 is shown where vehicles traveling on the roadway 13 may exit to reach a crossing street or roadway 15, which passes over the roadway 13. The crossing street or roadway 15 has vehicles 18A-C traveling in the correct direction along the street 15. However, a wrong-way vehicle 21 is shown as turning off the crossing street or roadway 15 and driving in the wrong direction down the exit ramp 14.

In operation, the computerized roadway safety system 22 continuously monitors the exit ramp 14, such as tollway or highway exit ramp, to detect a wrong way vehicle as soon as it enters the exit ramp 14. In particular, the computerized roadway safety system 22 may be communicatively coupled to the wrong way detector 20 which detects the presence and direction of the wrong way vehicle 21 as soon as it begins its entry onto the exit ramp 14 in the wrong direction. As disclosed herein, the detector 20 may utilize any suitable sensor technologies, such as active remote sensors (e.g., radar, ultra-wide band, lidar, etc.), magnetic coils in or below the surface of the exit ramp camera, a camera system to detect the presence of a wrong way vehicle, electronic sensors in the form of photoelectric sales or image sensors, an electric eye system that projects one or more beams of light across the width of the exit ramp, or pair of mechanical bars or petals that are depressed by the front tires of the vehicle 21. The Federal Highway administration has published an article describing some of these sensors, entitled "A New Look At Sensors," Issue No.: VOL. 71, No. 3; Date: November/December 2007.

The sensors of the wrong-way detector 20 may be in-roadway sensors, by the roadway sensors, or over-roadway sensors. A commonly used in-roadway sensor is the inductive loop detector which consists of loops of wire embedded into saw cuts in the road pavement. Other in-roadway sensors include magnetic detectors and wireless magnetometer vehicle detection systems. The Texas Department of Transportation ("TDOT") describes a wireless magnetometer vehicle detection system in a bid specification. TDOT, Traffic Operations Division, TO-8010, rev. 5-2015. Over-roadway sensors include video image processors, microwave radar, laser radar, ultrasonic and passive infrared sensors installed alongside or above the exit ramp. Acoustic sensors could also be used alongside the roadway. The sensors, such as photoelectric cells, may be installed in pairs to produce information for determining the direction and speed of the vehicle. The University of Texas, Austin, Center for Transportation Research has published an article describing the use of photoelectric sensors, entitled "Photoelectric Sensors for Counting and Classifying Vehicles, J. E. Garner and L. Huang, Transportation Research Record 1311.

When the detector 20 senses that the vehicle 21 has entered the ramp 14 in the wrong direction, the computerized roadway safety system 22 is connected and programmed to automatically launch a plurality of drones to fly in a crossing arm configuration 10 so that they are lined up together to hover at a predetermined location on the exit ramp 14 in front of the direction of travel of the wrong way vehicle 21. As depicted in FIG. 2, the drones may hover at any predetermined location along the exit ramp 14. For example, drones may be programmed to fly in a crossing arm configuration 11 so that they are lined up together to hover at a predetermined location on the exit ramp 14 to block access to and from the exit ramp 14.

As described more fully hereinbelow, the drones flying in any crossing arm configuration 10, 11 may be equipped with cameras to communicate images of the vehicle 21 and/or the driver to the computerized roadway safety system 22. In response, the computerized roadway safety system 22 may also communicate visually and/or audibly with the driver, providing instructions to the driver and what actions need to be taken. In addition, the drones flying in any crossing arm configuration 10, 11 may have sensors that detect and locate the vehicle 21 which enable the drones to determine if the wrong-way driver has self-corrected and left the exit ramp 14. In such a case, the drones flying in the crossing arm configuration 10 may be programmed to return to the docking station(s), either automatically or in response to signals from the computerized roadway safety system 22. However, if the wrong-way vehicle 21 does not self-correct, the drones 10, 11 maintain their position as a crossing arm barrier, resulting in the wrong way driver colliding with the drones as a way to prevent it from entering the roadway ahead.

Figure 3:
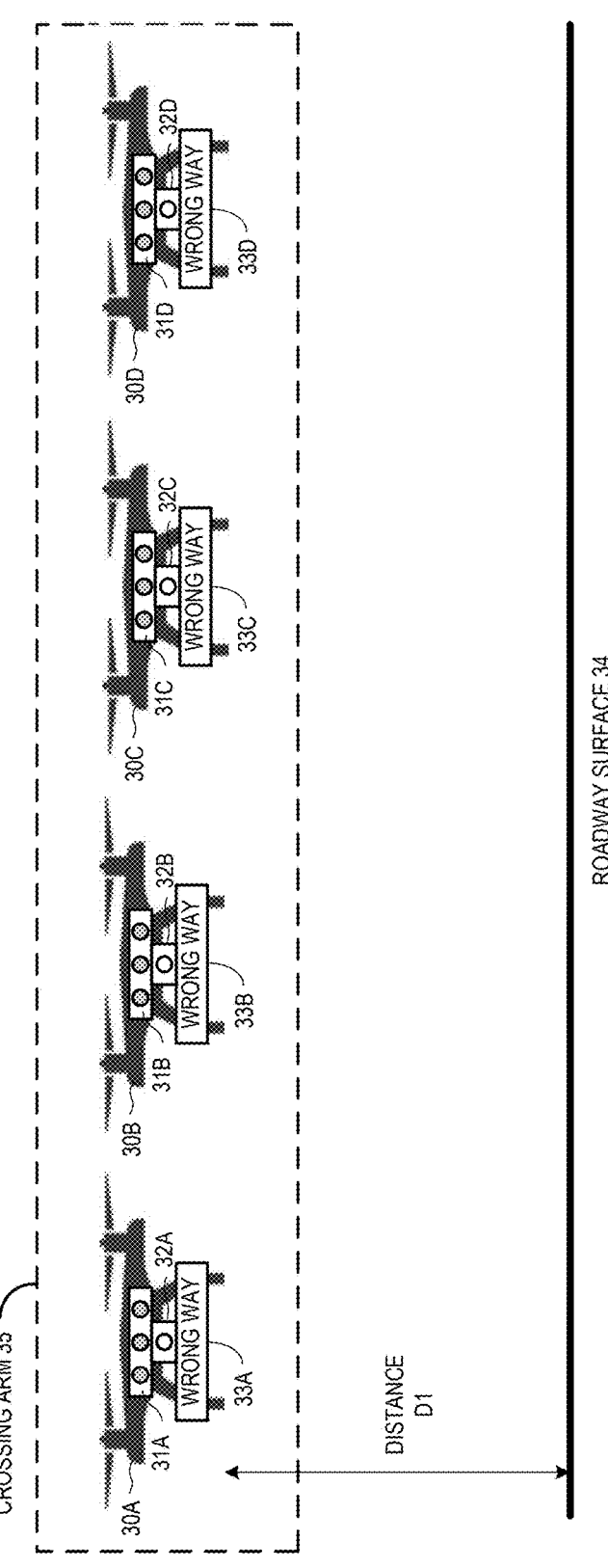
FIG. 3 shows a profile view of a plurality of drones hovering in a linear formation and at a predetermined distance above a roadway surface to form a crossing arm barrier in front of a wrong-way vehicle in accordance with selected embodiments of the present disclosure.

To provide additional details for an improved understanding of selected embodiments of the present disclosure, reference is now made to FIG. 3 which shows a profile view 3 of a plurality of drones 30A-D hovering in a linear formation and at a predetermined distance D1 above the roadway surface 34 to form a crossing arm barrier 35 in front of a wrong-way vehicle. As indicated with the dashed line, the crossing arm barrier 35 is not a single, solid barrier structure, but instead provides the visual appearance of a barrier structure by positioning the drones 30A-D close to one another. And while four drones 30A-D are shown, it will be appreciated that additional or fewer drones may be used to visually convey the crossing arm barrier 35.

As depicted, each drone 30A-D may be a battery-powered electric vertical take-off and landing (eVTOL) drone, though any suitable drone design may be used. With current technology, drones can move at speeds of 70 mph or more, which would enable them to quickly reach and stay up with the wrong-way vehicle. However, the drones 30A-D could also be powered by an internal combustion engine, but battery-powered drones may possess more advantages in this application. Each drone 30A-D includes a plurality of rotors or propellors connected to a quadcopter frame which houses the motor(s), speed controllers, flight controller boards, radio transmitters, radar sensors, battery, electronics, and power distribution cables. Through onboard controllers, radar sensors, and radio transmitters, the drones 30A-D are able to communicate with one another to coordinate their movement so that they can fly and hover in the linear formation that creates a physical "crossing arm" barrier 35 in front of a wrong-way vehicle.

Launched from a docking station in response to detection of a wrong-way vehicle, the drones 30A-D fly to a location over the roadway where they coordinate their respective positions to form a crossing arm 35 in front of the direction of travel of the wrong-way vehicle. In addition, the drones 30A-D coordinate their respective heights at the distance D1 that is approximately the same as the height of a hood of a typical vehicle so that it visible to the driver.

In addition, each drone 30A-D may include one or more audio-visual alert devices 31A-D to alert and warn a wrong-way driver that they are travelling in the wrong direction. Examples of audio-visual alert devices 31A-D include, but are not limited to, flashing lights and/or speakers which could provide an audible alert or warning to the driver. In addition, each drone 30A-D may include camera system 32A-D that may record and relay pictures of the driver of the wrong-way vehicle and/or the surrounding area. The camera system 32A-D may be mounted so it may be rotated 360 degrees to take pictures of a wrong-way vehicle and its surrounding environment. In addition, each drone 30A-D may include a signage or message panel 33A-D that says "WRONG WAY" or provides instructions to guide the driver of the wrong-way vehicle. The signage/message panel 33A- may be an LED light display system that enables it to display messages that are either preprogrammed or created by the central command center if it takes over the control of the drone 30A-D.

Figure 4:
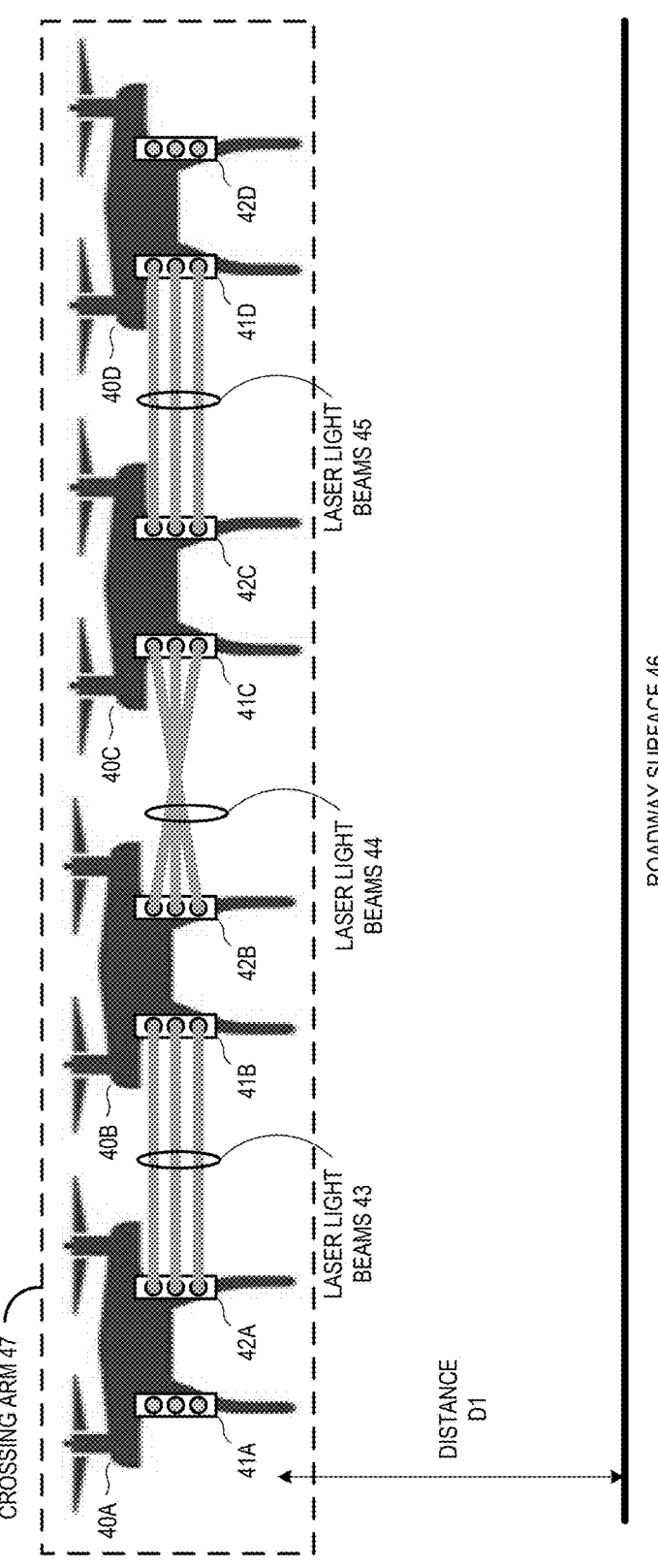
FIG. 4 shows a profile view of a plurality of drones hovering in a linear formation and at a predetermined distance above a roadway surface to form a crossing arm barrier in front of a wrong-way vehicle, where the drones have laser light sources that emit laser beams directed to a neighboring drone to enhance the image of a crossing arm in accordance with selected embodiments of the present disclosure.

To provide additional details for an improved understanding of selected embodiments of the present disclosure, reference is now made to FIG. 4 which shows a profile view 4 of a plurality of drones 40A-D hovering in a linear formation and at a predetermined distance D1 above the roadway surface 46, where the drones 40A-D have laser light sources 41A-D, 42A-D that emit laser beams 43, 44, 45 directed to a neighboring drone to enhance the image of a crossing arm 47 to form a crossing arm barrier in front of a wrong-way vehicle. As indicated with the dashed line, the crossing arm barrier 47 is not a single, solid barrier structure, but instead combines the drones 40A-D and laser beams 43-45 to provide the visual appearance of a barrier structure by positioning the drones 40A-D close to one another. And while four drones 40A-D are shown, it will be appreciated that additional or fewer drones may be used to visually convey the crossing arm barrier 47.

As depicted, each drone 40A-D may be a battery-powered eVTOL drone that is equipped with a plurality of rotors or propellors connected to a quadcopter frame which houses the motor(s), speed controllers, flight controller boards, radio transmitters, radar sensors, battery, electronics, and power distribution cables so that the drones 40A-D are able to communicate with one another to coordinate their movement so that they can fly and hover in the linear formation that creates a physical "crossing arm" barrier in front of a wrong-way vehicle. In addition, each drone 40A-D includes a pair of laser light sources 41A-D, 42A-D that emit laser beams directed to an adjacent drone to enhance the image of a crossing arm barrier. For example, each drone (e.g., 40A) includes two panels of laser light sources (e.g., 41A, 42A) which are affixed on opposed sides of the drone quadcopter frame or landing gear, though other arrangements and designs may be used to attach an array of laser lights sources to each drone. By positioning the laser light source panels 41A-D, 42A-D in alignment with one another and applying directional lens controls, the laser light beams can be directed to emit in any desired direction to create any pattern. For example, the light source panel 42A on the first drone 40A and the light source panel 41B on the second drone 40B are programmed to generate the laser light beams 43 as straight parallel lines between the first and second drones 40A, 40B which would further enhance the visual presentation of a crossing arm to an approaching driver. As just another illustrative example, the light source panel 42B on the second drone 40B and the light source panel 41C on the third drone 40C are programmed to generate the laser light beams 44 as crossing and intersecting lines between the second and third drones 40B, 40C which would further enhance the visual presentation of a crossing arm to an approaching driver.

Launched from a docking station in response to detection of a wrong-way vehicle, the drones 40A-D fly to a location over the roadway where they coordinate their respective positions to form a crossing arm 47 in front of the direction of travel of the wrong-way vehicle. In addition, the drones 40A-D coordinate their respective heights at the distance D1 that is approximately the same as the height of a hood of a typical vehicle so that it visible to the driver.

Figure 5:
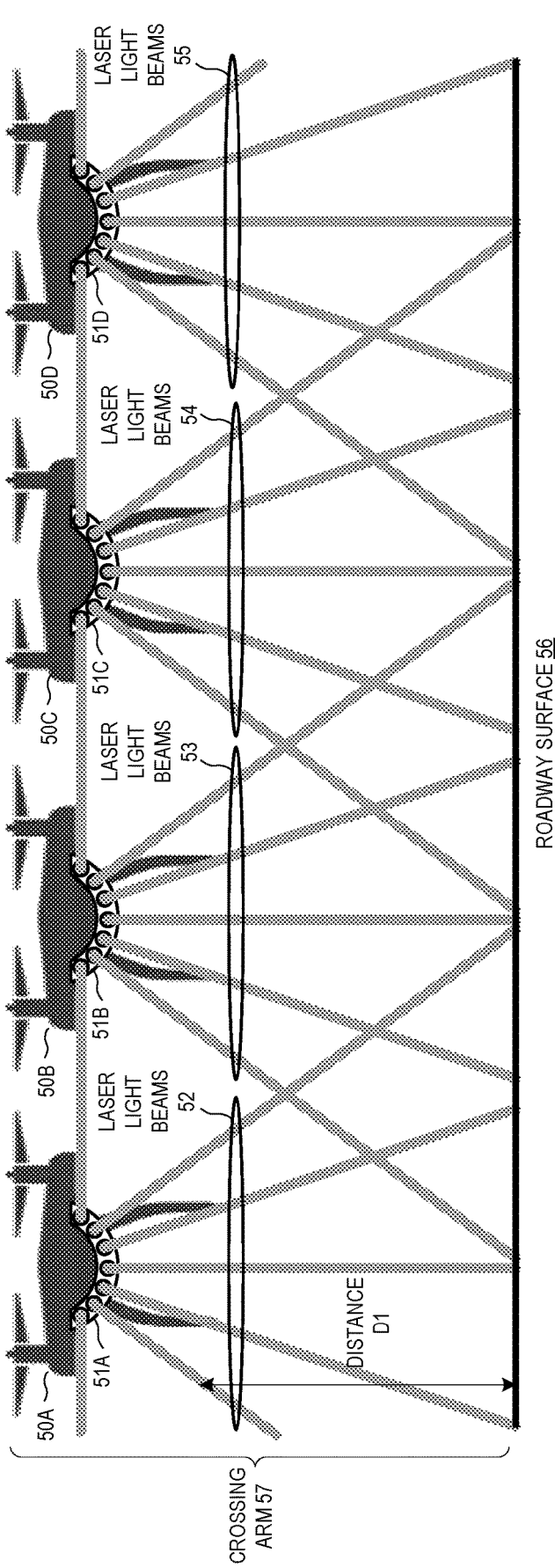
FIG. 5 shows a profile view of a plurality of drones hovering in a linear formation and at a predetermined distance above a roadway surface to form a crossing arm barrier in front of a wrong-way vehicle, where the drones have laser light sources that emit laser beams directed to create a blanket of light in front of a wrong-way vehicle in accordance with selected embodiments of the present disclosure.

To provide additional details for an improved understanding of selected embodiments of the present disclosure, reference is now made to FIG. 5 which shows a profile view 5 of a plurality of drones 50A-D hovering in a linear formation and at a predetermined distance D1 above the roadway surface 56, where the drones 50A-D have laser light sources 51A-D that emit laser beams 52-55 directed to create a blanket of light to form a crossing arm barrier 57 in front of a wrong-way vehicle. As indicated with the dashed line, the crossing arm barrier 57 is not a single, solid barrier structure, but instead combines the drone structures and laser beam blanket of light to provide the visual appearance of a barrier structure. And while four drones 50A-D with laser light beams 52-55 are shown, it will be appreciated that additional or fewer drones may be used to visually convey the crossing arm barrier 57.

As depicted, each drone 50A-D may be a battery-powered eVTOL drone that is equipped with a plurality of rotors or propellors connected to a quadcopter frame which houses the motor(s), speed controllers, flight controller boards, radio transmitters, radar sensors, battery, electronics, and power distribution cables so that the drones 50A-D are able to communicate with one another to coordinate their movement so that they can fly and hover in the linear formation that creates a physical "crossing arm" barrier in front of a wrong-way vehicle. In addition, each drone 50A-D includes a laser light source panel 51A-D that emits laser beams 52-55 directed to create a blanket of light to enhance the image of a crossing arm barrier. For example, each drone (e.g., 50A) includes a laser light source panel (e.g., 51A) which is affixed to the drone quadcopter frame or landing gear, though other arrangements and designs may be used to attach an array of laser lights sources to each drone. By positioning the laser light source panels 51A-D light source panels on the bottom of the drone quadcopter frames and applying directional lens controls, the laser light beams 52-55 can be directed to emit in any desired direction to create any pattern. For example, the laser light source panel 51A on the first drone 50A is programmed to generate the laser light beam pattern 52 which project onto the ground or roadway surface 56. In similar fashion, the laser light beam pattern 52 may be projected onto the ground or roadway surface 56 to enhance the visual presentation of a crossing arm 57 to an approaching driver. In another illustrative example, the light source panel 51A-D can be programmed to project laser light beams from the drones 50A-D and directly onto the roadway surface 56 ahead of the travel of the wrong way vehicle to present a further notification or alert to the wrong-way driver. In such embodiments, the laser beams may project a written warning message on the ground where it can be seen and read by the driver of the wrong-way vehicle.

Launched from a docking station in response to detection of a wrong-way vehicle, the drones 50A-D fly to a location over the roadway where they coordinate their respective positions to form a crossing arm 57 in front of the direction of travel of the wrong-way vehicle. In addition, the drones 50A-D coordinate their respective heights at the distance D1 that is approximately the same as the height of a hood of a typical vehicle so that it visible to the driver.

To provide additional details for an improved understanding of selected embodiments of the present disclosure, reference is now made to FIG. 6, which illustrates a simplified flow chart 6 showing the logic for operating a roadway safety system. As will be appreciated, the disclosed methodology may be implemented with a vehicle detection control system which is operatively connected with one or more vehicle detector sensors and/or surveillance systems, a central command center, and one or more drone docking stations for housing one or more drones that are deployed in response to the detection of a wrong-way vehicle by flying to form a crossing arm barrier in front of the driver of the wrong-way vehicle.

At step 61, the road safety system monitors an exit ramp for wrong-way (WW) vehicles. With reference to the example of FIG. 2, step 61 may be implemented by the computerized roadway safety system 22 which is connected to the wrong-way detector 20 or other surveillance system to continuously monitor the exit ramp 14 to detect the presence of a wrong-way vehicle (e.g., vehicle 21).

At step 62, the road safety system monitors detects a WW vehicle on the ramp. If there is no WW vehicle detected (negative outcome to detection step 62), the roadway safety system continues monitoring the exit ramp (step 61). However, when a WW vehicle is detected (affirmative outcome to detection step 62), the roadway safety system generates a detection signal which can be used to initiate a number of different responses.

At step 63, the road safety system may respond to the WW vehicle detection signal by notifying the command center and/or vehicle detector control system that a WW vehicle has entered the exit ramp. With reference to the example of FIG. 2, step 63 may be implemented by the computerized roadway safety system 22 detecting the WW vehicle 21 with the wrong-way detector 20, and then sending a signal to the central command center. In response, the command center and/or computerized roadway safety system 22 may activate one or more roadway alarms along the exit ramp 14 and roadway 13 at step 64. With reference to the example of FIG. 2, step 64 may be implemented by the central command center activating warning signage or/or audio speakers (not shown) positioned along the roadway 13 or exit ramp 14 to provide an alert that WW vehicle 21 has been detected on the exit ramp 14. In addition or in the alternative, the command center may establish a communication link to communicate with the other vehicles (e.g., 16C) on the road 13 using a drone which includes a signage or message panel and/or a set of audio speakers.

At step 65, the road safety system responds to the WW vehicle detection signal by launching one or more drones to fly to a position over the exit ramp in front of the WW vehicle. With reference to the example of FIG. 2, step 65 may be implemented by the computerized roadway safety system 22 launching the drone cross arm 10 to fly to a position in front of the WW vehicle 21. In addition or in the alternative, step 65 may be implemented by the computerized roadway safety system 22 launching the drone cross arm 20 to fly to a position at the entrance to the exit ramp 14 from the road 13.

At step 66, the drones hover in a line to form a crossing arm barrier in front of the WW vehicle. With reference to the example of FIG. 2, step 65 may be implemented by the drone crossing arm 10 hovering in front of the WW vehicle 21 until it stops moving. In addition or in the alternative, step 66 may be implemented by the drone cross arm 20 hovering at the entrance to the exit ramp 14 from the road 13 to hover at a location that is in front of the WW vehicle 21 and also positioned to prevent oncoming cars (e.g., 16C) on the road 13 from entering the exit ramp 14.

In addition or in the alternative, the drones illuminate their light beams between the drones at step 70, thereby enhancing the visibility of the crossing arm barrier formed by the hovering drones. With reference to the example of FIG. 4, step 70 may be implemented by the drone crossing arm 47 hovering in front of the WW vehicle and emitting laser beams 43-45 to enhance the image of a crossing arm 47 to form a crossing arm barrier in front of a wrong-way vehicle before proceeding to detection step 67.

In addition or in the alternative, the drones illuminate light beams in front of the WW vehicle at step 71, thereby enhancing the visibility of the crossing arm barrier formed by the hovering drones. With reference to the example of FIG. 5, step 71 may be implemented by the drone crossing arm 57 hovering in front of the WW vehicle and emitting laser beams 52-55 to enhance the image of a crossing arm 57 to create a blanket of light in front of the WW vehicle before proceeding to detection step 67.

At step 67, the computerized roadway safety system 22 determines if the WW vehicle stopped or self-corrected. With reference to the example of FIG. 2, step 67 may be implemented by using sensors, including cameras, on the exit ramp 14 and/or sensors, including cameras, on the drones forming the drone crossing arms 10, 11.

If the WW vehicle stopped (affirmative outcome to detection step 67), the drones return to the docking station at step 68. However, if the WW vehicle fails to stop and leave the exit ramp (negative outcome to detection step 67), the drones continue to hover in place at step 69 to maintain the crossing arm barrier for blocking or colliding with the WW vehicle. If the wrong way vehicle does not stop, it would collide with one or more of the plurality of drones forming the crossing arm. The collision with the drones is intended to awaken the wrong way driver that they are proceeding in the wrong direction and finally causing them to stop.

To provide additional details for an improved understanding of selected embodiments of the present disclosure, reference is now made to FIG. 7, which depicts a simplified block diagram of a computer-based system 7 for implementing a vehicle detection and drone deployment system for launching multiple drones which fly to a position and hover in formation in front of the wrong-way vehicle to form a crossing arm barrier to the approaching wrong-way vehicle. As disclosed, the computer-based system 7 includes input user device(s) 716, such as a control panel, keyboard and/or mouse, which are coupled to a bi-directional system bus 708. The input user device(s) 716 are used for introducing user input to the computer-based system 7 and communicating that user input to one or more processors 702. The computer-based system 7 may also include a video memory 704, main memory 706 for storing a vehicle detector and drone control warning system 705, I/O device(s) 710, drone and docking station control 718, and mass storage 720, all coupled to bi-directional system bus 708 along with input user device(s) 716 and processor(s) 702. The mass storage 720 may include both fixed and removable media, such as other available mass storage technology. Bus 708 may contain, for example, 32 address lines for addressing video memory 704 or main memory 706. The system bus 708 may also include, for example, an n-bit data bus for transferring data between and among the components, such as CPU 702, video memory 704, main memory 706, drone and docking control station 718, and mass storage 720, where "n" is, for example, 32 or 64. Alternatively, multiplex data/address lines may be used instead of separate data and address lines.

The computer-based system 7 also includes one or more I/O device(s) 710 that may provide connections to communication interface circuits, such radio frequency transceiver (Tx/Rx) devices 709 used by the drone devices to communicate with one another and/or with the vehicle detection and drone deployment system. In addition, the one or more I/O device(s) 710 may provide connections to peripheral devices, including one or more sensors 711 (such as magnetic sensors, electronic sensors, photoelectric sensors, cameras and physical sensors) such as used by the vehicle detection and drone deployment system. The I/O device(s) 710 may also provide a direct connection to remote server computer systems via a telephone link or to the Internet via an ISP, a wireless link, or the like. I/O device(s) 710 may also include a network interface device to provide a direct connection to remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 720 until loaded into main memory 706 for execution. For example, the vehicle detector and drone control warning system 705 may be loaded into main memory 706 for execution by the one or more processors 702 to provide the functionality described herein. Computer programs may also be in the form of electronic signals modulated in accordance with the computer program and data communication technology when transferred via a network. The method and functions relating to system and method for providing a roadway safety system are stored with computer program code embodying the vehicle detection and drone deployment system. As will be appreciated, once the computer-based system 7 is configured to implement the vehicle detection and drone deployment system, the computer-based system 7 becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates the road safety improvements by allowing dangerous wrong-way vehicles to be detected and stopped before a head on collision can happen.

The processor 702, in one embodiment, is a microprocessor manufactured by Motorola Inc. of Illinois, Intel Corporation of California, Nvidia Corporation of California, or Advanced Micro Devices of California. However, any other suitable single or multiple microprocessors or microcomputers may be utilized. Main memory 706 is comprised of dynamic random access memory (DRAM). Video memory 704 is a dual-ported video random access memory. One port of the video memory 704 is coupled to video amplifier or driver 712. The video amplifier or driver 712 is used to drive the display 714. Video amplifier 712 is well known in the art and may be implemented by any suitable means. This circuitry converts pixel data stored in video memory 704 to a raster signal suitable for use by display 714. Display 714 is a type of monitor suitable for displaying graphic images.

Under control of the processor(s) 702, the principal hardware elements of the road safety system include the sensor(s) 711 for detecting the presence and/or vehicle identification number of any wrong-way vehicle(s), and the drone and docking station controller 718 which controls the operation of the drone docking stations and/or the deployment of one or more drones to fly into a crossing arm barrier that hovers in front of a wrong-way vehicle in response to detecting wrong-way vehicles. In addition, the principal hardware elements of the road safety system include the vehicle detector and drone control warning system module 705 for monitoring the sensor(s) 711, activating and deploying one or more warning drones, notifying the command center of wrong-way vehicles, activating roadway alarms, capturing vehicle identification numbers, sending vehicle identification numbers to the command center, and/or contacting the wrong-way vehicle to alert the driver. In selected embodiments, each drone may include a vehicle detector and drone control warning system 705 for responding to an activation or deployment signal, monitoring location information for the wrong-way vehicle, flying the drone to a location in front of the wrong-way vehicle, communicating with other drones to coordinate their movement so that they can fly and hover in the linear formation that creates a physical "crossing arm" barrier in front of a wrong-way vehicle, and activating light sources on the drone that illuminate the plurality of preprogrammed robotic drones and/or create laser light beams to enhance a visual appearance of the crossing arm barrier. For example, a first sensor 711 may be provided to detect that a vehicle has entered an exit ramp in the wrong direction, a second sensor 711 may be provided to detect that the vehicle has continued to drive down the exit ramp in the wrong direction, and these sensors may provide sensor data over the I/O device(s) 710 to the processor(s) 702 for storage and/or processing by the vehicle detector and drone control warning system module 705 to detect that a vehicle is entering an exit ramp in the wrong direction as it drives onto the exit ramp, to transmit a wrong-way vehicle detection signal to activate and deploy one or more drones to autonomously fly to a designated location on the roadway in front of the wrong-way vehicle where the drones hover in formation at a pre-determined height above the exit ramp to act as a "crossing arm" barrier to the approaching wrong-way vehicle.

While the invention has been described in connection with what is presently considered to be the most practical and preferred embodiment, it will be appreciated that other variations and alternatives to the disclosed examples are also contemplated, and the present invention is not necessarily limited to the example embodiments, which illustrate inventive aspects of the present invention that are applicable to various roadway safety and drone warning system applications. Thus, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as are permitted under the law. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various change, substitutions and alterations without departing from the spirit and scope of the invention in its broadest form.

By now, it should be appreciated that there has been provided an apparatus, method, program code, and roadway safety system for stopping wrong way vehicles on a roadway. In the disclosed methodology, a plurality of preprogrammed robotic drones is maintained at a drone docking station(s) located near an exit ramp and that houses a plurality of preprogrammed robotic drones that are controlled by a computerized roadway safety system. The disclosed methodology also includes continuously monitoring the exit ramp of a roadway with one or more sensors positioned at an exit end of the exit ramp to promptly detect when any wrong-way vehicle enters the exit end of the exit ramp from a wrong direction. In addition, the disclosed methodology includes transmitting a wrong-way vehicle detection signal from the one or more sensors to a computerized roadway safety system upon detecting a wrong-way vehicle entered the exit ramp from the wrong direction. The disclosed methodology also includes launching a plurality of preprogrammed robotic drones from the drone docking station in response to the wrong-way vehicle detection signal, where the plurality of preprogrammed robotic drones fly to a position over the exit ramp in front of the wrong-way vehicle and automatically hover in a linear formation and at a predetermined distance above the exit ramp to form a crossing arm barrier in front of the wrong-way vehicle to block forward movement of the wrong-way vehicle. In selected embodiments, the plurality of preprogrammed robotic drones maintain the crossing arm barrier in a position over the exit ramp to collide with the wrong-way vehicle that does not stop before reaching the plurality of preprogrammed robotic drones. In selected embodiments, the plurality of preprogrammed robotic drones maintain the crossing arm barrier in a position over the exit ramp to collide with the wrong-way vehicle that does not stop before reaching the plurality of preprogrammed robotic drones. In other selected embodiments, the plurality of preprogrammed robotic drones monitor movement of the wrong-way vehicle on the exit ramp, and automatically return to the drone docking station after the wrong-way vehicle stops movement along the exit ramp in the wrong direction and leaves the exit ramp. In other selected embodiments, the disclosed methodology may also include controlling at least the first robotic drone to hover in a position in front of the wrong-way vehicle or any vehicles exiting onto the exit ramp from a roadway and to provide an alert that the wrong-way vehicle has been detected. In selected embodiments, the disclosed methodology may also include activating light sources on the plurality of preprogrammed robotic drones that illuminate the plurality of preprogrammed robotic drones to enhance a visual appearance of the crossing arm barrier formed by the plurality of preprogrammed robotic drones while hovering above the exit ramp. In other selected embodiments, the disclosed methodology may also include activating light sources on the plurality of preprogrammed robotic drones that project laser light beams to enhance a visual appearance of the crossing arm barrier formed by the plurality of preprogrammed robotic drones while hovering above the exit ramp. In such embodiments, the laser light beams may include one or more laser light beams between adjacent drones in the plurality of preprogrammed robotic drones. In other selected embodiments, the disclosed methodology may also include activating light sources on the plurality of preprogrammed robotic drones that project laser light beams onto a road surface of the exit ramp to enhance a visual appearance of the crossing arm barrier formed by the plurality of preprogrammed robotic drones while hovering above the exit ramp. In such embodiments, the laser light beams may be projected onto the road surface of the exit ramp to create a warning message to warn a driver to change a travel direction of the wrong-way vehicle.

In another form, there is provided a roadway safety system, apparatus, and associated method of operation. As disclosed, the roadway safety system includes one or more sensors connected and configured to continuously monitor a roadway to detect when any wrong-way vehicle that travels on the roadway in a wrong direction. In addition, the roadway safety system includes a vehicle detection and drone control system connected to said one or more sensors to detect a wrong-way vehicle and generate a wrong-way vehicle detection signal. The roadway safety system also includes a plurality of battery-powered eVTOL drones which are programmed to respond to the wrong-way vehicle detection signal by flying to a position over the roadway in front of the wrong-way vehicle and to hover in a linear formation and at a predetermined distance above the roadway to form a crossing arm barrier in front of the wrong-way vehicle to block forward movement of the wrong-way vehicle. In selected embodiments, the plurality of battery-powered eVTOL drones is programmed to maintain the crossing arm barrier in a position over the roadway to collide with the wrong-way vehicle that does not stop before reaching the plurality of battery-powered eVTOL drones. In other selected embodiments, the plurality of battery-powered eVTOL drones is programmed to monitor movement of the wrong-way vehicle on the roadway, and automatically return to a launching station after the wrong-way vehicle stops movement along the roadway in the wrong direction and leaves the roadway. In selected embodiments, each drone in the plurality of battery-powered eVTOL drones may include an attached light source that is activated to enhance a visual appearance of the crossing arm barrier formed by the plurality of battery-powered eVTOL drones while hovering above the roadway. In such embodiments, the attached light source may include one or more laser beam generators that are activated to enhance a visual appearance of the crossing arm barrier formed by the plurality of battery-powered eVTOL drones while hovering above the roadway. In selected embodiments, the one or more laser beam generators at each drone are configured and controlled to illuminate an adjacent drone from the plurality of battery-powered eVTOL drones which is flying in the linear formation. In other selected embodiments, the one or more laser beam generators at each drone are configured and controlled to project laser light beams onto a surface of the roadway to enhance a visual appearance of the crossing arm barrier formed by the plurality of preprogrammed robotic drones while hovering above the roadway. In such embodiments, the laser light beams may be projected onto the surface of the roadway to create a warning message for a driver of the wrong-way vehicle.

In yet another form, there is provided an autonomous drone device, system, and associated method of operation. As disclosed, the autonomous drone device includes a first radio frequency transceiver device configured to receive a wrong-way vehicle detection signal from a drone controller. In addition, the disclosed autonomous drone device includes a second radio frequency transceiver device configured to communicate with one or more additional autonomous drone devices. The disclosed autonomous drone device also includes one or more processing devices and one or more computer readable memories for storing operational program code instructions for execution by the one or more processing devices, the operational program code instructions. In particular, the operational program code instructions include program instructions to detect, at the first radio frequency transceiver device, the wrong-way vehicle detection signal from the drone controller. In addition, the operational program code instructions include program instructions to launch the autonomous drone device to fly to a position over a roadway in front of the wrong-way vehicle. The operational program code instructions also include program instructions to communicate with the one or more additional autonomous drone devices through the second radio frequency transceiver device to coordinate positioning of the autonomous drone device and one or more additional autonomous drone devices to hover in a linear formation and at a predetermined distance above the roadway to form a crossing arm barrier in front of the wrong-way vehicle to block forward movement of the wrong-way vehicle. In selected embodiments, the operational program code instructions also include program instructions to communicate with the one or more additional autonomous drone devices through the second radio frequency transceiver device to coordinate positioning of the autonomous drone device and one or more additional autonomous drone devices to hover in a linear formation and at a predetermined distance above the roadway to form a crossing arm barrier in front of the wrong-way vehicle to block forward movement of the wrong-way vehicle. In selected embodiments, the autonomous drone device may also include one or more laser light beam generators that are activated to enhance a visual appearance of the crossing arm barrier formed by the autonomous drone device and one or more additional autonomous drone devices while hovering above the roadway. In such embodiments, the one or more laser light beam generators may be configured and controlled to project laser light beams onto a surface of the roadway to enhance a visual appearance of the crossing arm barrier formed by the autonomous drone device and one or more additional autonomous drone devices while hovering above the roadway.

While the invention has been described in connection with what is presently considered to be the most practical and preferred embodiment, it will be appreciated that other variations and alternatives to the disclosed examples are also contemplated, and the present invention is not necessarily limited to the example embodiments, which illustrate inventive aspects of the present invention that are applicable to various roadway safety applications. Thus, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for stopping wrong way vehicles on a roadway, comprising:
   continuously monitoring an exit ramp of a roadway with one or more sensors positioned at an exit end of the exit ramp to promptly detect when any wrong-way vehicle enters the exit end of the exit ramp from a wrong direction;
   transmitting a wrong-way vehicle detection signal from the one or more sensors to a computerized roadway safety system upon detecting a wrong-way vehicle entered the exit ramp from the wrong direction;
   maintaining a drone docking station that is located within a range of the exit ramp and that houses a plurality of preprogrammed robotic drones that are controlled by the computerized roadway safety system;
   launching, in response to the wrong-way vehicle detection signal, a plurality of preprogrammed robotic drones from the drone docking station to fly to a position over the exit ramp in front of the wrong-way vehicle, where the plurality of preprogrammed robotic drones automatically hover in a linear formation and at a predetermined distance above the exit ramp to form a crossing arm barrier in front of the wrong-way vehicle to block forward movement of the wrong-way vehicle; and
   activating light sources on the plurality of preprogrammed robotic drones that project laser light beams to enhance a visual appearance of the crossing arm barrier formed by the plurality of preprogrammed robotic drones while hovering above the exit ramp, where the laser light beams comprise one or more laser light beams between adjacent drones in the plurality of preprogrammed robotic drones.

2. The method of claim 1, where the plurality of preprogrammed robotic drones maintain the crossing arm barrier in a position over the exit ramp to collide with the wrong-way vehicle that does not stop before reaching the plurality of preprogrammed robotic drones.

3. The method of claim 1, where the plurality of preprogrammed robotic drones monitor movement of the wrong-way vehicle on the exit ramp, and automatically return to the drone docking station after the wrong-way vehicle stops movement along the exit ramp in the wrong direction and leaves the exit ramp.

4. The method of claim 1, further comprising activating light sources on the plurality of preprogrammed robotic drones that illuminate the plurality of preprogrammed robotic drones to enhance a visual appearance of the crossing arm barrier formed by the plurality of preprogrammed robotic drones while hovering above the exit ramp.

5. The method of claim 1, further comprising activating light sources on the plurality of preprogrammed robotic drones that project laser light beams onto a road surface of the exit ramp to enhance a visual appearance of the crossing arm barrier formed by the plurality of preprogrammed robotic drones while hovering above the exit ramp.

6. The method of claim 5, where the laser light beams are projected onto the road surface of the exit ramp to create a warning message to warn a driver to change a travel direction of the wrong-way vehicle.

7. A roadway safety system, comprising:

one or more sensors connected and configured to continuously monitor a roadway to detect when any wrong-way vehicle that travels on the roadway in a wrong direction;

a vehicle detection and drone control system connected to said one or more sensors to detect a wrong-way vehicle and generate a wrong-way vehicle detection signal; and a plurality of battery-powered eVTOL drones which are programmed to respond to the wrong-way vehicle detection signal by flying to a position over the roadway in front of the wrong-way vehicle and to hover in a linear formation and at a predetermined distance above the roadway to form a crossing arm barrier in front of the wrong-way vehicle to block forward movement of the wrong-way vehicle, where each drone in the plurality of battery-powered eVTOL drones comprises one or more laser beam generators that are activated to enhance a visual appearance of the crossing arm barrier formed by the plurality of battery-powered eVTOL drones while hovering above the roadway, where the one or more laser beam generators at each drone are configured and controlled to illuminate an adjacent drone from the plurality of battery-powered eVTOL drones which is flying in the linear formation.

8. The roadway safety system of claim 7, where the plurality of battery-powered eVTOL drones is programmed to maintain the crossing arm barrier in a position over the roadway to collide with the wrong-way vehicle that does not stop before reaching the plurality of battery-powered eVTOL drones.

9. The roadway safety system of claim 7, where the plurality of battery-powered eVTOL drones is programmed to monitor movement of the wrong-way vehicle on the roadway, and automatically return to a launching station after the wrong-way vehicle stops movement along the roadway in the wrong direction and leaves the roadway.

10. The roadway safety system of claim 7, where each drone in the plurality of battery-powered eVTOL drones comprises an attached light source that is activated to enhance a visual appearance of the crossing arm barrier formed by the plurality of battery-powered eVTOL drones while hovering above the roadway.

11. The roadway safety system of claim 7, where the one or more laser beam generators at each drone are configured and controlled to project laser light beams onto a surface of the roadway to enhance a visual appearance of the crossing arm barrier formed by the plurality of preprogrammed robotic drones while hovering above the roadway.

12. The roadway safety system of claim 11, where the laser light beams are projected onto the surface of the roadway to create a warning message for a driver of the wrong-way vehicle.

13. An autonomous drone device, comprising:

a first radio frequency transceiver device configured to receive a wrong-way vehicle detection signal from a drone controller;

a second radio frequency transceiver device configured to communicate with one or more additional autonomous drone devices;

a plurality of light sources that project laser light beams; and one or more processing devices and one or more computer readable memories for storing operational program code instructions for execution by the one or more processing devices, the operational program code instructions comprising:

program instructions to detect, at the first radio frequency transceiver device, the wrong-way vehicle detection signal from the drone controller;

program instructions to launch the autonomous drone device to fly to a position over a roadway in front of the wrong-way vehicle;

program instructions to communicate with the one or more additional autonomous drone devices through the second radio frequency transceiver device to coordinate positioning of the autonomous drone device and one or more additional autonomous drone devices to hover in a linear formation and at a predetermined distance above the roadway to form a crossing arm barrier in front of the wrong-way vehicle to block forward movement of the wrong-way vehicle; and program instructions to activate the plurality of light sources to project laser light beams to enhance a visual appearance of the crossing arm barrier, where the laser light beams comprise one or more laser light beams that are projected onto one or more adjacent autonomous drone devices in the one or more additional autonomous drone devices.

14. The autonomous drone device of claim 13, where the operational program code instructions further comprise program instructions to control the autonomous drone device to communicate with the one or more additional autonomous drone devices through the second radio frequency transceiver device to maintain the crossing arm barrier in a position over the roadway to collide with the wrong-way vehicle that does not stop before reaching the autonomous drone device and one or more additional autonomous drone devices.

15. The autonomous drone device of claim 13, further comprising one or more laser light beam generators that are activated to enhance a visual appearance of the crossing arm barrier formed by the autonomous drone device and one or more additional autonomous drone devices while hovering above the roadway.

16. The autonomous drone device of claim 15, where the one or more laser light beam generators are configured and controlled to project laser light beams onto a surface of the roadway to enhance a visual appearance of the crossing arm barrier formed by the autonomous drone device and one or more additional autonomous drone devices while hovering above the roadway.

\* \* \* \* \*